United States Patent

Houzouji et al.

[11] Patent Number: 5,735,389
[45] Date of Patent: Apr. 7, 1998

[54] CONVEYING SYSTEM

[75] Inventors: Masahiko Houzouji, Hannan; Osamu Sakamoto, Sennan, both of Japan

[73] Assignee: Bando Kagaku Kabushiki Kaisha, Kobe, Japan

[21] Appl. No.: 676,283

[22] PCT Filed: Nov. 17, 1994

[86] PCT No.: PCT/JP94/01952

§ 371 Date: Jul. 17, 1996

§ 102(e) Date: Jul. 17, 1996

[87] PCT Pub. No.: WO96/15965

PCT Pub. Date: May 30, 1996

[51] Int. Cl.⁶ .................................................. B65G 15/00
[52] U.S. Cl. ..................................... 198/809; 198/597
[58] Field of Search ............... 198/370.08, 370.03, 198/370.1, 465.2, 580, 809, 463.3

[56] References Cited

U.S. PATENT DOCUMENTS

| | | | |
|---|---|---|---|
| 3,951,254 | 4/1976 | Juhrend | 198/809 |
| 4,511,030 | 4/1985 | Lem | 198/809 X |
| 5,165,516 | 11/1992 | Reed et al. | 198/809 X |
| 5,201,401 | 4/1993 | Haderer et al. | 198/597 X |

FOREIGN PATENT DOCUMENTS

| | | | |
|---|---|---|---|
| 0232451 | 3/1960 | Australia | 198/809 |
| 0002106 | 5/1979 | European Pat. Off. | 198/809 |
| 2644240 | 4/1977 | Germany | 198/809 |
| 49-6753 | 2/1974 | Japan . | |
| 53-1540 | 1/1978 | Japan . | |
| 1-103686 | 7/1989 | Japan . | |

*Primary Examiner*—James R. Bidwell
*Attorney, Agent, or Firm*—Marshall, O'Toole, Gerstein, Murray & Borun

[57] ABSTRACT

A conveying unit (1) capable of stopping at precise points in an assembly line or the like comprises a conveyor (10), a lift (20) and a support (30) as main components. The conveyor (10) is a double-belt type belt conveyor wherein synchro rubber belts (13) are set over drive pulleys (11) and plural driven pulleys (12) and the pulleys (11) are connected with each other with a shaft (14). The lift (20) is constructed of two sets of frames on which the elevation of the conveyor (10) can be varied through the use of a pair of air bags. The support (30) is conveying path in the desired fixing position.

6 Claims, 3 Drawing Sheets

CONVEYING SYSTEM

TECHNICAL FIELD

The present invention relates to a conveying system for conveying various objects such as work pieces, components and materials as objects to be transported in transverse directions (horizontal directions and those close to them).

BACKGROUND TECHNOLOGY

To convey various objects in transverse directions, various conveyors, such as roller conveyor, power moller (product's name), belt conveyor and chain conveyor, etc. have been used up to the present. Objects to be transported are placed on rollers or a belt or a chain being stretched across, then the rollers, etc. are driven to carry the objects to be transported. When an object to be transported reaches a desired position, the movement of the rollers, etc. will be stopped to halt the conveying.

When a conveying system is composed of only various conveyors described above, it is difficult to achieve accurate positioning of objects to be transported at a specified position being one of the destinations of conveying. Even if the conveyor itself is stopped, and the condition thereof is maintained by a brake, etc., the position of the object to be transported itself is not stable since the object to be transported may slip or tilt on the rollers, belt or chain. For instance, when an automated machine threads bolts in specified positions of a certain component being conveyed and held stationary by a conveyor, the position of the component will not be set correctly, hence the automatic machine will not be able to bring the bolts onto the exact positions (threaded holes or the like in the component) and the position of the component may shift during threading. In such a case, therefore, a special means, such as a mechanism for holding the object to be transported, will be needed for positioning and fixing. It, however, is not easy to achieve simultaneously the holding action and keeping the object to be transported immobile under its condition of being held.

It was also difficult for conventional conveying systems comprising various conveyors to transport objects to be transported properly along a path with a bent of a specified angle. It is possible to provide a guide on a side along the conveying path to forcefully change the conveying direction of the objects to be transported; it, however, results in a large loss of the conveying power and is inefficient, and one can not expect a constant conveying direction of the objects to be transported.

The object of the present invention is to provide a conveying system which is capable, not only of normal conveying in transverse directions, but also of easily and stably positioning the object to be transported during stop at a destination of conveying, and a conveying system which is capable of properly transporting objects to be transported along a path with bents.

DISCLOSURE OF THE INVENTION

The conveying system described in claim 1 of the present invention comprises a conveyor for conveying objects to be transported in transverse directions (horizontal directions and directions close to them), a support provided in the conveying path at a point at which the object to be transported is to be positioned, and an elevation changing means for moving up or down the conveyor to transfer the object to be transported between the support and the conveyor.

The conveying system described in claim 1 makes conveying and positioning of the objects to be transported during stop as follows. First, the normal conveying is made by driving the conveyor while the conveyor is kept raised by the elevation changing means. When the object to be transported is transported to a specified conveying destination at which the object to be transported is to be positioned, such as a point at which the object to be transported is subjected to external processing, welding, etc. or piping is connected to the object to be transported, the conveyor will be stopped and the conveyor will be lowered by the elevation changing means. As the support is present within the conveying path at the point, when the conveyor is lowered, the object to be transported being loaded on the conveyor can be transferred onto the support. The support is a fixed structure, and in contrast with the conveyor, the support will bear the object to be transported in a hard-to-move condition; the object to be transported will become stable at a certain elevation and it will be easier to subject the object to processing, welding, piping, etc. When the support is not a simple flat structure but, for example, a structure with a tapered portion for guiding the object to be transported to an optimal position or a structure having fitting members for positively restraining the object to be transported, the position of the object to be transported will be determined with a higher precision or the object to be transported will become immobile. When processing, etc. at the point is completed, the conveyor will be raised by the elevation changing means to load again the object to be transported onto the conveyor, then the conveyor will be driven to, for example, transport the object to be transported to the next conveying destination.

The conveying means of claim 2 comprises two sets of conveyors arranged to cross with each other so as to convey objects to be transported in transverse directions along a bent path (with, for example, a right-angled corner), and an elevation changing means for raising or lowering at least one of the two sets of conveyors so as to transfer the objects to be transported between these conveyors. It is provided with an elevation changing means for one of the conveyors as a major component of configuration common to the conveying system of claim 1.

The conveying system of claim 2 smoothly conveys objects to be transported between two sets of conveyors arranged to cross with each other along a bent path (naturally on the bent path). First, the conveying elevation of the upstream set of conveyor of the two sets of conveyors is kept above that of the downstream set of conveyor, and the object to be transported is conveyed by the conveyor on the upstream side to a point where both the conveyors cross with each other (a crossing point). The reason for setting the conveyors in such an above-and-below relation is that if the conveying elevation of the conveyor of the downstream side is above, it would be hard to transport the object onto said conveyor and the conveyor on the upstream side could not transport the object to be transported to said crossing point. This above-and-below relationship is realized by the elevation changing means provided at least for one of sets of conveyors. When the conveyor on the upstream side is provided with said means, the conveyor is to be raised first, and in contrast, when the conveyor on the downstream side is provided with said means, the conveyor on the downstream side is to be lowered first. When the object to be transported is conveyed to the crossing point, the conveyor on the upstream side will be stopped, and the conveying elevation thereof will be lowered beneath that of the conveyor on the downstream side to transfer the object to be transported onto the conveyor on the downstream side. This can be effected by lowering the conveyor on the upstream side or raising the conveyor on the downstream side. After that, when the conveyor on the downstream side is driven, the object to be transported will be transported along the path of the conveyor on the downstream side (bent path relative to the conveyor on the conveyor on the upstream side). As no external forces are applied to the object to be transported except the forces from the conveyors or the object to be transported is not slid or rotated, the orientation of the object to be transported will not change. With regard to the above-mentioned conveying systems, as further described in claim 3, a belt conveyor or belt conveyors wherein the objects to be transported are loaded on the back of a toothed rubber belt (synchro rubber belt) may be used as a conveyor or conveyors. In the conveyor system of claim 3, a belt conveyor or belt conveyors comprising a synchro rubber belt are used, first, with the action of the teeth thereof (as there will be no slippage against pulleys), the rate of transport can be controlled with precision. Accordingly, the object to be transported can be correctly stopped at a point wherein the object is to be subjected to processing, etc., and more over, when the object to be transported is to be transported along a bent path, the object can be stopped at an optimal position within said crossing point for ideal transfer between the conveyors. Secondly, as a rubber belt or rubber belts are used, it has advantages of lower vibrations and sounds in case of high speed conveyance. This is desirable from the viewpoint of work environment and is also desirable for execution of works that require precision such as processing.

BEST FORM FOR EMBODYING THE INVENTION

Figure 1A:
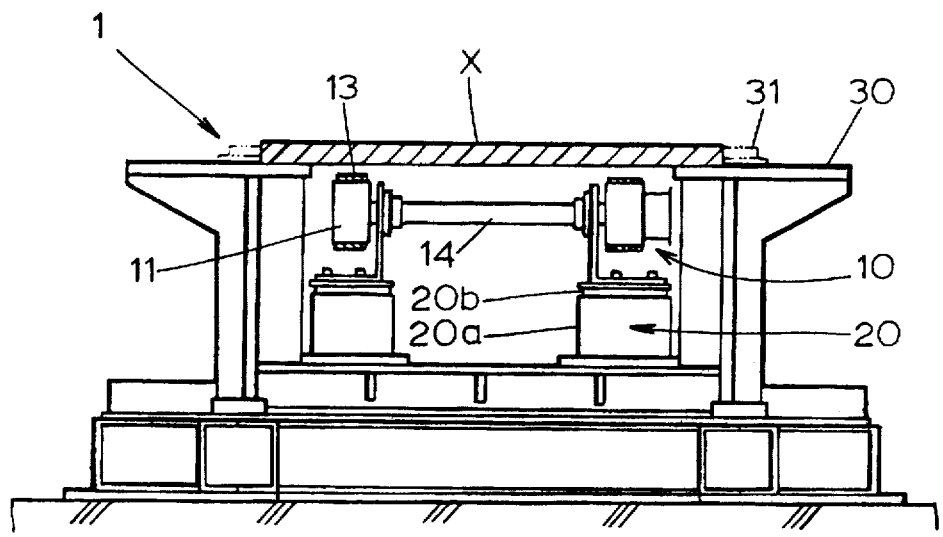
FIG. 1 is a front view (FIG. 1 (a)) showing an essential portion (conveying unit) of a conveying system of FIG. 2 being the first embodiment of the present invention, and a side view thereof (FIG. 1 (b)).
Figure 1B:
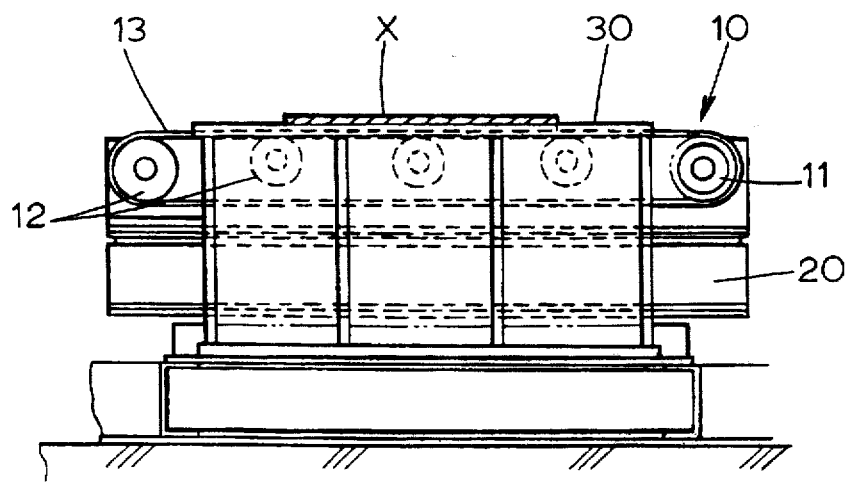
Figure 2:
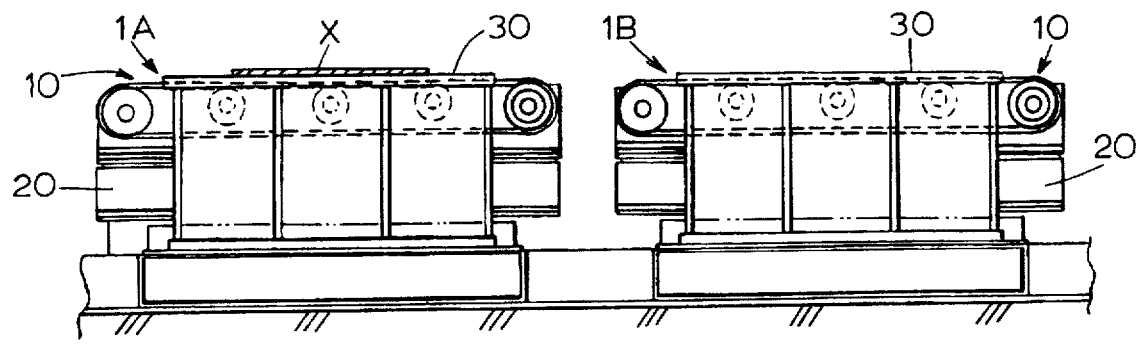
FIG. 2 is a side view showing the conveying system being the first embodiment of the present invention.

The first embodiment of the present invention is shown in FIG. 1 and FIG. 2. In the conveying system shown in FIG. 2, the object to be transported (not illustrated) is mounted onto a conveying base X, and the object to be transported is transported linearly together with the conveying base X and stopped at specified two points on the conveying path in the predetermined positions for processing, etc. The conveying system comprises two conveying units 1A and 1B being arranged linearly, and the respective units 1A and 1B have a common construction and the details are shown by the conveying unit 1 of FIG. 1.

The conveying unit 1 (hence both the unit 1A and the unit 1B) comprises, as shown in FIG. 1 (a) and (b), a conveyor 10, a lift (elevation changing means) 20 and a support 30 being the major components. The conveyor 10 is a double-belt type belt conveyor wherein synchro rubber belts (toothed rubber belts) 13 are set over drive pulleys 11 and plural driven pulleys 12 and the drive pulleys 11 are connected with each other with a shaft 14. The lift 20 is frames of which elevation can be varied, wherein a cylindrical frame 20a having an open top end and a fixed bottom is inserted with a cylindrical frame 20b having a little smaller outer diameter at the upper movable side and an open bottom end slidably in the vertical direction, and an air bag (not illustrated) which increases the elevation when air is filled into the bag is stored in the space enclosed by both the frames; the entire conveyor 10 is mounted on the respective frames. The support 30 is formed of members of high rigidity to stably bear the base X on the conveying path in the desired fixing position (FIG. 1 (b)). Rotary roller type or fixed block type guide members 31 are provided on the support 30 along both sides of the base X.

FIG. 1 (a) shows the conveying unit 1 is keeping a base X on the support 30, and from this condition, if the conveyor 10 is raised by the lift 20, the base X will be loaded on the belts 13 of the conveyor 10, then the base X can be transported to the left or to the right of FIG. 1 (b) by driving the belts 13 by means of the drive pulleys 11. The elevation of the base X from the support 30 by loading the base X on the conveyor 10 is about 10 mm, and during this transportation, the edges of the base X will contact the guide members 31 and be guided by them. Because the belts 13 are synchro belts, the base X can be stopped at desired exact points (for instance, in the middle of FIG. 1 (b)), and after the stoppage, when the conveyor 10 is lowered again by the lift 20, the base X will be held stably held on the support 30.

In a conveying system wherein two conveying units 1 mentioned above are arranged in series as shown in FIG. 2, a conveying base X can be transported in the following manner:

① First, from the condition wherein the base X is on the conveying unit 1A as shown in FIG. 2, the lifts 20 of both the units 1A and 1B are started to raise both the conveyors 10.

② When detectors (not illustrated) in the respective units 1A and 1B detect the rise of the conveyors 10, the driving motors (not illustrated) of the respective conveyors 10 will start up to transport the base X to the right, then onto the conveying unit 1B and the transportation will continue.

③ When the base X reaches a specified fixed position (the center relative to both the right and the left of the diagram) on the unit 1B, the detector (not illustrated) of the unit 1B will detect to stop the conveyor 10, and the conveyors 10, 10 will be lowered by the lifts 20 to complete transfer of the base X onto the support 30.

Figure 3A:
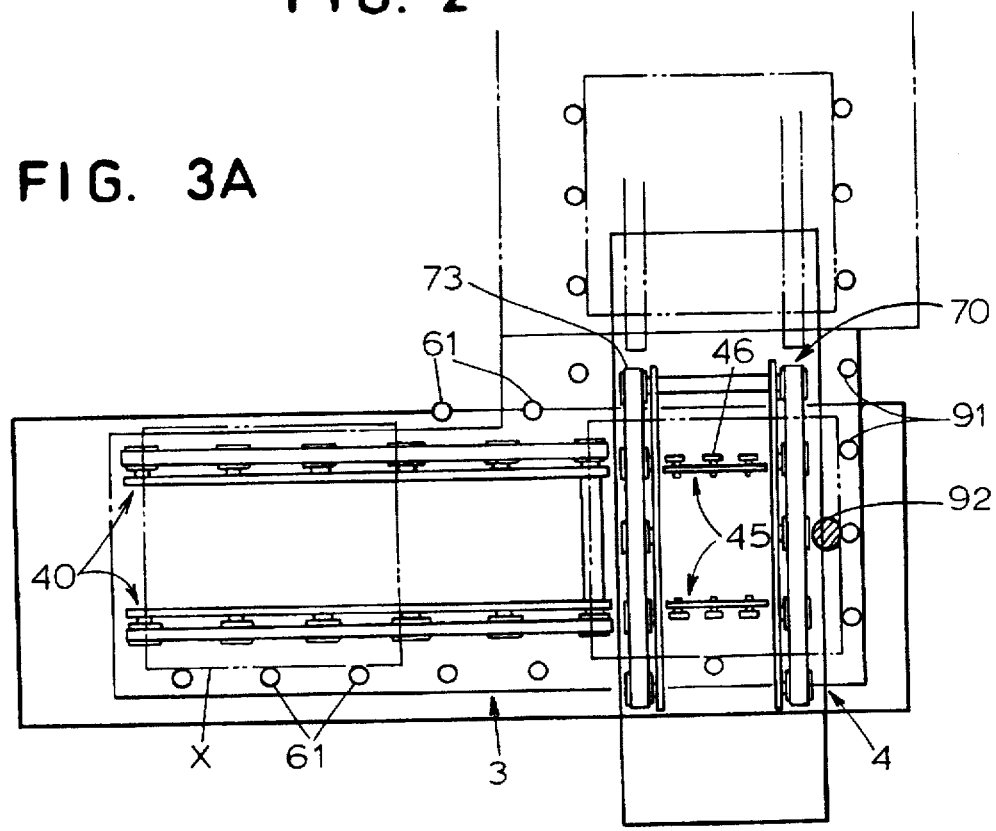
FIG. 3 is a plan view of a conveying system being the second embodiment of the present invention (FIG. 3 (a)) and a front view thereof (FIG. 3 (b)).
Figure 3B:
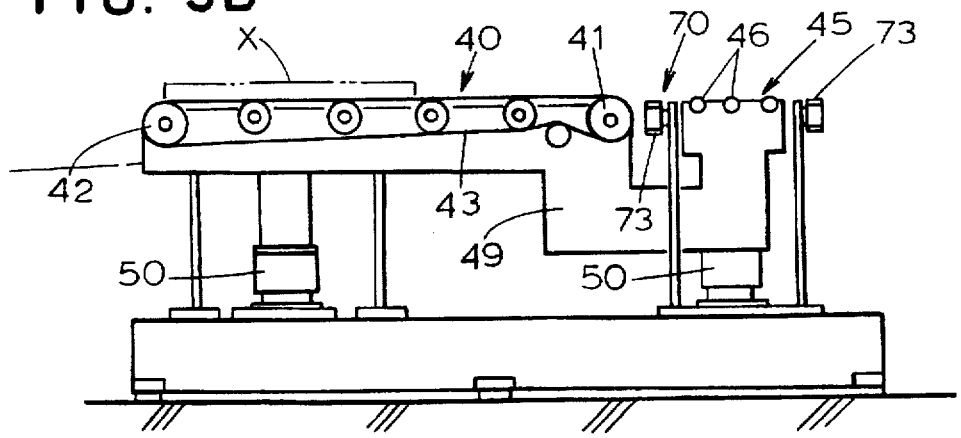

FIG. 3 shows a conveying system being the second embodiment of the present invention. In this conveying system, two conveying units 3 and 4 (including conveyors as will be described later) are crossed perpendicularly so as to transport conveying bases X similar to those mentioned above along a path with a bend of 90 degrees.

The conveying unit 4 mainly comprises an ordinary belt conveyor 70 using two synchro rubber belts 73 as shown in the diagram, but the conveying unit 3 is a unit of elevation changing type which has some parts common to the conveying unit 1 of the above-mentioned first embodiment (see FIG. 1). In the conveying unit 3, a belt conveyor 40 and a roller conveyor 45 are used as a set and arranged on a frame 49 as shown in FIG. 3 (b), and the frame 49 is mounted on a lift 50 similar to one shown in the first embodiment. The belt conveyor 40 comprises two synchro rubber belts 43 being stretched over drive pulleys 41 and plural driven pulleys 42, and the roller conveyor 45 comprises rotating rollers 46 arranged in two rows in the position shown in the diagram, where the two units 3 and 4 cross with each other on the imaginary extension of the conveyor 40 (crossing point portion). Both sides of the conveying path being formed by both the units 3 and 4 for bases X are provided with guiding members 61 and 91 in the form of freely horizontally rotatable rollers. The conveyor 40 and the conveyor 45 are arranged as a set on an integral frame 49, and the conveyor 70 is provided independently of them, hence this conveying system comprising two conveying units 3 and 4 have two sets of conveyors.

FIG. 3 (b) shows a condition in which the tops of the conveyors 40 and 45 are a little higher than the elevation of the top of the conveyor 70, and when the elevation thereof is lowered together with the frame 49 by the lift 50, the top of the conveyor 70 will become a little higher than the tops of the conveyors 40 and 45. When the tops of the conveyors 40 and 45 are higher than the top of the conveyor 70, it is possible to make the base X pass over one of the belts 73 of the conveyor 70, hence one can freely transport the base X to the right and to the left of FIG. 3 (a) including the rectangular crossing point portion. On the other hand, when the conveyor 70 is higher, one can transport the base X in the up and down direction of the same diagram including the same portion.

With the composition and actions described above, this conveying system conveys the base X (and the object to be transported) along a rectangular path in the following manner:

① The base X, which is on the conveyor 40 on the left as shown in the diagram, is transported to the right by driving the conveyor 40.

② As the tops of the conveyor 40 and 45 are kept higher than that of the conveyor 70 by the lift 50, the base X is smoothly transferred onto the conveyor 45 located at the crossing point portion.

③ When the detector 92 provided on the conveying unit 4 detects the arrival of the base X at the crossing point portion, the conveyor 40 will be stopped, and the position of the set of the conveyors 40 and 45 will be lowered by the lift 50.

④ When the conveyors 40 and 45 descend, the base X will be loaded onto the conveyor 70, then when the completion of descent is detected by a detector (not illustrated), the conveyor 70 will be started up to begin the conveyance to the perpendicular direction.

In the above case of transporting the base X from the conveying unit 3, via the rectangular corner, to the conveying unit 4 (then to an adjacent conveying system indicated by imaginary lines) has been described, it is also possible to convey the base X in the reverse direction thereof. Furthermore, a support similar to that of the conveying unit 1 of the first embodiment may be provided, when necessary, in the conveying path of the unit 3. Since in the unit 3 the elevations of the conveyors 40 and 45 can be changed, if processing or the like is needed for an object to be transported on the base X, provision of a support having an adequate elevation at the processing position will be sufficient to enable transfer onto the support, in turn, enabling stable support, when necessary, of the object to be transported.

Figure 4:
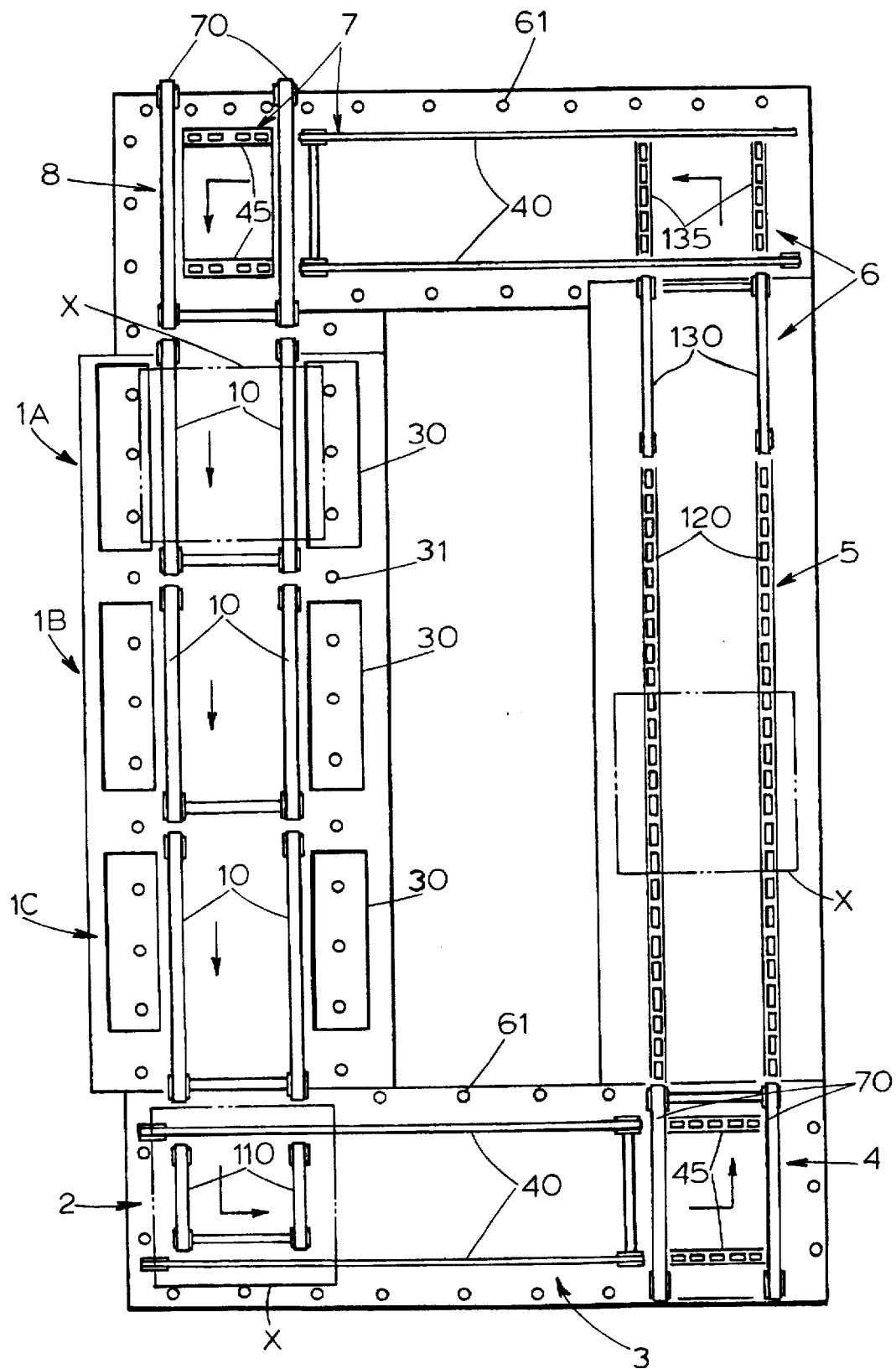
FIG. 4 is a plan view showing the third embodiment of the present invention.

Next, in FIG. 4, the third embodiment of the present invention is shown in a plan view. It comprises conveying units 1A, 1B and 1C having the same construction with those shown in the first embodiment (FIG. 1 and FIG. 2), and conveying units 3 and 4 and conveying units 7 and 8 all having the same construction with those of the second embodiment (FIG. 3), and other conveying units 2, 5 and 6, all being combined to transport the conveying bases X along a rectangular-loop-shaped path. The unit 2 is provided with a belt conveyor 110, and the unit 5 is provided with a roller conveyor 120, and the unit 6 is provided with a belt conveyor 130 and a roller conveyor 135, and all of them are of the ordinary types having no elevation changing functions.

The provision of the conveying units 3 and 4 and the conveying units 7 and 8 at corners (two out of four) is designed to smoothly convey the bases X at the respective corners bending by 90 degrees. In the combination of the units 3 and 4, and in the combination of the units 7 and 8, one set of conveyors 40 and 45 in one unit is capable of changing the elevation relative to the conveyor 70 of the other unit, hence just in the case of the above-mentioned embodiment, it is possible to make smooth cornering of 90 degrees. The conveyor 110 in the conveying unit 2 and the conveyors 130 and 135 in the unit 6 are of the ordinary type, and in contrast to them, the respective conveyors 40 of the units 3 and 7 can change their elevations and can transfer the bases X, hence similar cornering can be made at other two corners, and as a whole, conveyance along the rectangular loop illustrated can be made.

The reason of the provision of conveying units 1A, 1B and 1C similar to those of the above-mentioned first embodiment is that automated machines (not illustrated) give certain processings to the objects to be transported on the bases X at the corresponding three points. The bases X being transported sequentially are transferred from the conveyors 10 onto the supports 30 at these three points, respectively; placement on fixed positions make it easy to give processings at the respective points. The manner the units 1A, 1B and 1C transport the bases X by means of conveyors 10 and transfer the bases X onto the supports 30 is just as described in the first embodiment.

POTENTIALS OF INDUSTRIAL APPLICATIONS

The conveying system described in claim 1 of the present invention is capable not only of normal conveying in transverse directions but also stabilizing the position of an object to be transported during stoppage at a conveying destination or accurately positioning thereof. Hence processing, welding, part connection, etc. can be made smoothly by automated machines, etc. on the objects to be transported at rest.

The conveying system of claim 2 is capable of smoothly transporting objects to be transported along a path with a bend of 90 degrees or another angle without changing the orientation thereof.

The conveying system of claim 3 is capable of more accurately and smoothly positioning and conveying objects to be transported along bent path, and as vibrations and noises are small, said system is preferable in terms of environment, processing precisions, etc.

We claim:

1. A conveying system comprising a conveying unit, a pair of lifts, and a support, wherein:

the conveying unit comprises a pair of belts stretched over driving pulleys connected to each other by a shaft;

each of the lifts comprises a pair of vertically-engaged cylindrical hollow frames, the frames having open ends with slightly different diameters, the open end of one frame being smoothly inserted into the open end of the other frame;

each of the lifts comprises an air bag stored in the space enclosed by the frames, the air bag being capable of increasing the height of said frames when filled with air; and the conveying unit is mounted on the frames of the lifts.

2. A conveying system as recited in claim 1, in which removal of air from the air bags lowers the belts to a position below the support.

3. A conveying system as recited in claim 1, wherein two conveying units are arranged in series.

4. A conveying system comprising two conveying units crossing at right angles to each other, wherein:

one of said conveying units comprises a belt conveyor using two belts;

the other conveying unit is a height-changeable unit arranged on frames mounted on lifts, and comprises two belts stretched over driving pulleys and a plurality of driven pulleys; and the system comprises a roller conveyor comprising rotating rollers arranged in two rows where the two conveying units cross each other, the rotating rollers being arranged as a set with the height-changeable unit on an integral frame independent of the other conveying unit.

5. A conveying system as recited in claim 4, in which one of the conveying units has a support upon which conveyed material can be supported at intermediate locations on that conveying unit without contact with the belts on that conveying unit.

6. A conveying system as recited in claim 4 wherein the conveying units comprise guiding members in the form of freely rotatable horizontal rollers.

* * * * *

UNITED STATES PATENT AND TRADEMARK OFFICE
CERTIFICATE OF CORRECTION

PATENT NO. : 5,735,389
DATED : April 7, 1998
INVENTOR(S) : Houzouji et al.

It is certified that error appears in the above-identified patent and that said Letters Patent is hereby corrected as shown below:

Column 1, lines 45-46, "can not" should be one word "cannot".

Column 1, line 55, "bents" should be "bends".

Column 3, line 8, a new paragraph should of been started at "With regard".

Column 3, line 13, a new paragraph should have been started at "In the conveyor".

Column 2, line 55, "the" needs to be added between "one of" and "sets".

UNITED STATES PATENT AND TRADEMARK OFFICE
CERTIFICATE OF CORRECTION

PATENT NO.  : 5,735,389
DATED       : April 7, 1998
INVENTOR(S) : Houzouji et al.

It is certified that error appears in the above-identified patent and that said Letters Patent is hereby corrected as shown below:

Column 4, line 23, "will be held stably held on the support 30", should be "will be held stably on the support 30".

Signed and Sealed this

Tenth Day of October, 2000

Attest:

Q. TODD DICKINSON

Attesting Officer

Director of Patents and Trademarks